(12) United States Patent
Sugimoto et al.

(10) Patent No.: US 9,936,103 B2
(45) Date of Patent: Apr. 3, 2018

(54) DETERMINATION DEVICE, CORRECTION DEVICE, OUTPUT DEVICE, AND DETERMINATION METHOD

(71) Applicant: FUJI XEROX CO., LTD., Tokyo (JP)

(72) Inventors: Shuichi Sugimoto, Yokohama (JP); Kenji Mori, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/794,492

(22) Filed: Jul. 8, 2015

(65) Prior Publication Data

US 2016/0248934 A1 Aug. 25, 2016

(30) Foreign Application Priority Data

Feb. 20, 2015 (JP) .................. 2015-031891

(51) Int. Cl.
*H04N 1/40* (2006.01)
*H04N 1/60* (2006.01)

(52) U.S. Cl.
CPC ......... *H04N 1/6027* (2013.01); *H04N 1/6033* (2013.01)

(58) Field of Classification Search
None
See application file for complete search history.

(56) References Cited

U.S. PATENT DOCUMENTS

| 2009/0073469 | A1 | 3/2009 | Kita et al. | |
| 2009/0147291 | A1* | 6/2009 | Kobashigawa | .... G03G 15/5058 358/1.13 |
| 2009/0296121 | A1 | 12/2009 | Yasunaga | |
| 2010/0322652 | A1* | 12/2010 | Torimaru | ........... G03G 15/0131 399/66 |
| 2012/0274986 | A1* | 11/2012 | Harashima | ......... G03G 15/5058 358/3.21 |
| 2013/0071131 | A1* | 3/2013 | Hirabayashi | ....... G03G 15/5041 399/30 |

FOREIGN PATENT DOCUMENTS

| CN | 101387844 A | 3/2009 |
| CN | 101592894 A | 12/2009 |
| JP | 2001-136391 A | 5/2001 |
| JP | 2014-186243 A | 10/2014 |

OTHER PUBLICATIONS

Nov. 23, 2017 Office Action issued in Chinese Patent Application No. 201510563199.3.

* cited by examiner

*Primary Examiner* — John Wallace
(74) *Attorney, Agent, or Firm* — Oliff PLC (57) ABSTRACT

A determination device includes an acquisition unit that acquires an output characteristic representing a relationship between a gradation value corrected by a correction unit in accordance with a predetermined correction characteristic and a measured value of a density of a toner image output by an output device for the gradation value; an estimation unit that estimates a density of a toner image output by the output device for a predetermined reference gradation value when the reference gradation value is not within a range of the corrected gradation value, the estimation being performed based on the output characteristic acquired by the acquisition unit; and a determination unit that determines whether or not the correction characteristic needs to be changed by comparing the density estimated by the estimation unit with a predetermined threshold.

19 Claims, 7 Drawing Sheets

DETERMINATION DEVICE, CORRECTION DEVICE, OUTPUT DEVICE, AND DETERMINATION METHOD

CROSS-REFERENCE TO RELATED APPLICATIONS

This application is based on and claims priority under 35 USC 119 from Japanese Patent Application No. 2015-031891 filed Feb. 20, 2015.

BACKGROUND

Technical Field

The present invention relates to a determination device, a correction device, an output device, and a determination method.

SUMMARY

According to an aspect of the invention, there is provided a determination device including an acquisition unit that acquires an output characteristic representing a relationship between a gradation value corrected by a correction unit in accordance with a predetermined correction characteristic and a measured value of a density of a toner image output by an output device for the gradation value; an estimation unit that estimates a density of a toner image output by the output device for a predetermined reference gradation value when the reference gradation value is not within a range of the corrected gradation value, the estimation being performed based on the output characteristic acquired by the acquisition unit; and a determination unit that determines whether or not the correction characteristic needs to be changed by comparing the density estimated by the estimation unit with a predetermined threshold.

BRIEF DESCRIPTION OF THE DRAWINGS

An exemplary embodiment of the present invention will be described in detail based on the following figures, wherein.

DETAILED DESCRIPTION

1. Exemplary Embodiment 1-1. Overall Structure of Image Forming System

Figure 1:
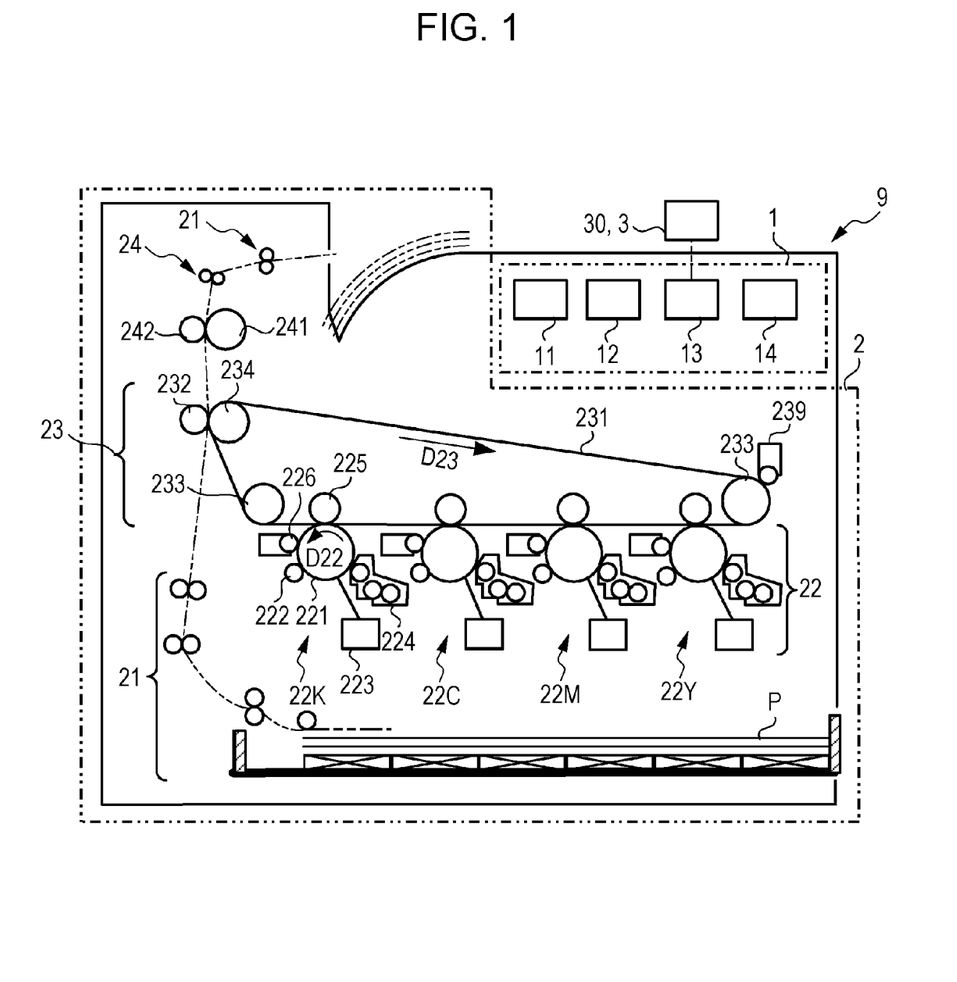
FIG. 1 illustrates the overall structure of an image forming system according to an exemplary embodiment.

FIG. 1 illustrates the overall structure of an image forming system 9 according to an exemplary embodiment. As illustrated in FIG. 1, the image forming system 9 includes a correction device 1 and an output device 2. The image forming system 9 may also include a measurement device 3 that measures an image output by the output device 2.

The correction device 1 includes a controller 11, a storage unit 12, an operation unit 13, a display 14, and a signal line for transmitting a control signal to the output device 2. The correction device 1 is used to cause the output device 2 to output an image, and has a function of correcting data of an image to be output (image data) in accordance with the characteristics of the output device 2.

The output device 2 includes a transport unit 21, developing units 22Y, 22M, 22C, and 22K, a transfer unit 23, a heating unit 24, and an interface for receiving the control signal transmitted from the correction device 1.

The letters Y, M, C, and K appended to the reference numeral 22 represent that the structures respectively correspond to yellow, magenta, cyan, and black toners. The developing units 22Y, 22M, 22C, and 22K basically have similar structures except for the toner that is used. When it is not necessary to distinguish the developing units 22Y, 22M, 22C, and 22K from each other, the developing units will be referred to simply as "developing units 22" without the letters representing the toner colors appended at the end.

The controller 11 includes a central processing unit (CPU), a read only memory (ROM), and a random access memory (RAM). The CPU reads computer programs stored in the ROM or the storage unit 12 (hereinafter referred to simply as programs) and executes the programs so as to control each part of the image forming system 9.

The operation unit 13 includes operation elements, such as operation buttons, for receiving various instructions. The operation unit 13 is operated by a user, and supplies a signal corresponding to the operation to the controller 11. The operation unit 13 also includes an interface for receiving data from, for example, a colorimeter 30, which is an example of the measurement device 3.

The storage unit 12 is a large-capacity memory, such as a hard disc drive, and stores the programs to be read by the CPU included in the controller 11. The storage unit 12 also stores a correction characteristic 121, color chart data 122, image data 123, and a color conversion profile 124 illustrated in FIG. 2. The data stored in the storage unit 12 will be described below.

The display 14 includes a liquid crystal display, and displays the result of the determination performed by the controller 11 and information stored in the storage unit 12. The display 14 and the operation unit 13 may form a touch panel together.

The transport unit 21 includes a container and transport rollers. The container contains sheets of paper P that are cut into a predetermined size in advance and that serve as media. The sheets of paper P contained in the container are fed one at a time by the transport rollers and transported to the transfer unit 23 along a sheet transport path in accordance with an instruction from the controller 11. The media are not limited to sheets of paper, and may instead be, for example, resin sheets. The media are not particularly limited as long as toner images may be recorded on the surfaces thereof.

Each developing unit 22 includes a photoconductor drum 221, a charging device 222, an exposure device 223, a developing device 224, a first transfer roller 225, and a drum cleaner 226. The photoconductor drum 221 is an image carrier that includes a charge generating layer and a charge transport layer, and is rotated in the direction of arrow D22 in FIG. 1 by a drive unit (not shown). The charging device 222 charges the surface of the photoconductor drum 221.

The exposure device 223 includes a laser source and a polygonal mirror (neither is shown). The exposure device 223 is controlled by the controller 11 so as to emit a laser beam corresponding to data representing an image toward the photoconductor drum 221 that has been charged by the charging device 222. Thus, an electrostatic latent image is formed on the photoconductor drum 221.

The data representing an image is basically the color chart data 122 and the image data 123 stored in the storage unit 12. However, the controller 11 may instead receive the data from an external device through a communication unit (not shown). The external device may be, for example, a reading device capable of reading an original image or a storage device that stores data representing an image.

The developing device 224 contains two-component developer containing Y, M, C, or K toner and magnetic carrier such as ferrite powder. The tip of a magnetic brush formed in the developing device 224 is brought into contact with the surface of the photoconductor drum 221, so that the toner adheres to portions of the surface of the photoconductor drum 221 that have been exposed to light by the exposure device 223, that is, to image portions of the electrostatic latent image. Thus, a toner image (image) is formed (developed) on the photoconductor drum 221.

The first transfer roller 225 generates a predetermined potential difference between the photoconductor drum 221 and an intermediate transfer belt 231 included in the transfer unit 23 at a position where the photoconductor drum 221 faces the intermediate transfer belt 231. Owing to the potential difference, the toner image is transferred onto the intermediate transfer belt 231. The drum cleaner 226 removes the toner that has not been transferred and that remains on the surface of the photoconductor drum 221 after the transferring of the toner image, and also removes electricity from the surface of the photoconductor drum 221.

The transfer unit 23 includes the intermediate transfer belt 231, a second transfer roller 232, belt transport rollers 233, a backup roller 234, and a belt cleaner 239. The transfer unit 23 transfers the toner images formed by the developing units 22 onto a sheet of paper P of the type determined in accordance with an instruction from the user.

The intermediate transfer belt 231 is an endless belt member and is wrapped around the belt transport rollers 233 and the backup roller 234. At least one of the belt transport rollers 233 and the backup roller 234 is provided with a drive unit (not shown) that rotates the intermediate transfer belt 231 in the direction of arrow D23 in FIG. 1. Accordingly, the toner images on the intermediate transfer belt 231 are moved to the region between the second transfer roller 232 and the backup roller 234.

Owing to a potential difference between the second transfer roller 232 and the intermediate transfer belt 231, the toner images on the intermediate transfer belt 231 are transferred onto the sheet of paper P that has been transported by the transport unit 21. The belt cleaner 239 removes toner that has not been transferred and that remains on the surface of the intermediate transfer belt 231. The transfer unit 23 or the transport unit 21 transports the sheet of paper P onto which the toner images have been transferred to the heating unit 24.

The heating unit 24 fixes the toner images that have been transferred onto the sheet of paper P by applying heat. The heating unit 24 includes a heating roller 241 and a pressing roller 242. The pressing roller 242 presses the sheet of paper P that has been transported by the transport unit 21 against the heating roller 241, which is heated, while being rotated by a driving unit or a rotating mechanism (not shown). Thus, the pressing roller 242 assists the heating of the sheet of paper P by the heating roller 241.

1-2. Functional Structure of Correction Device

Figure 2:
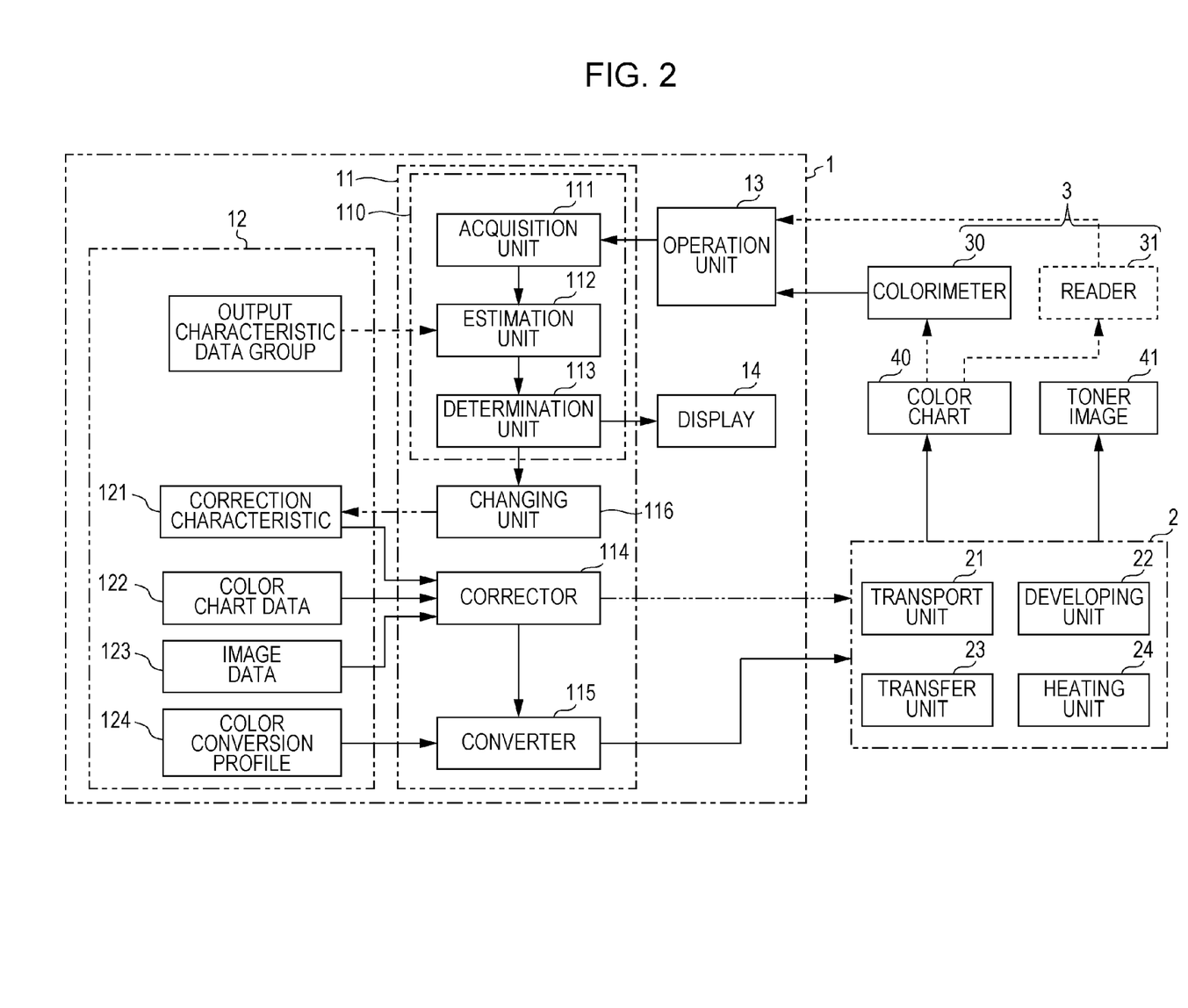
FIG. 2 illustrates the functional structure of a correction device included in the image forming system.

FIG. 2 illustrates the functional structure of the correction device 1 included in the image forming system 9. The controller 11 included in the correction device 1 functions as an acquisition unit 111, an estimation unit 112, a determination unit 113, a corrector 114, and a converter 115 by executing the programs stored in the storage unit 12.

The corrector 114 serves as a correction unit that corrects a gradation value of the color chart data 122 and the image data 123 in accordance with the predetermined correction characteristic 121. In the initial state before shipment, the correction characteristic 121 stored in the storage unit 12 is set on the assumption that the gradation value is not to be corrected. At the time of shipment, the correction characteristic 121 is updated to a set value determined in accordance with an output characteristic acquired when the gradation value is not corrected.

The output characteristic represents the relationship between a gradation value and a measured value of a density of a toner image output by the output device 2 for the gradation value. The output characteristic may be provided as a correspondence table showing the correspondence between plural gradation values supplied to the output device 2 and measured values of densities of toner images output by the output device 2 for the gradation values.

Alternatively, when an independent variable x represents a gradation value supplied to the output device 2 and a dependent variable y represents a measured value of a density of a toner image output by the output device 2 for the gradation value, the output characteristic may be provided as a function of y depending on x. In this case, the measurement device 3 may specify the function and supply parameters of the specified function to the correction device 1, thereby enabling the acquisition unit 111 to acquire the output characteristic. The measurement device 3 may determine the parameters of the function by interpolating, by the least squares method or the like, points plotted on a graph for measured toner densities and gradation values corresponding to the measured toner densities.

Figure 3A:
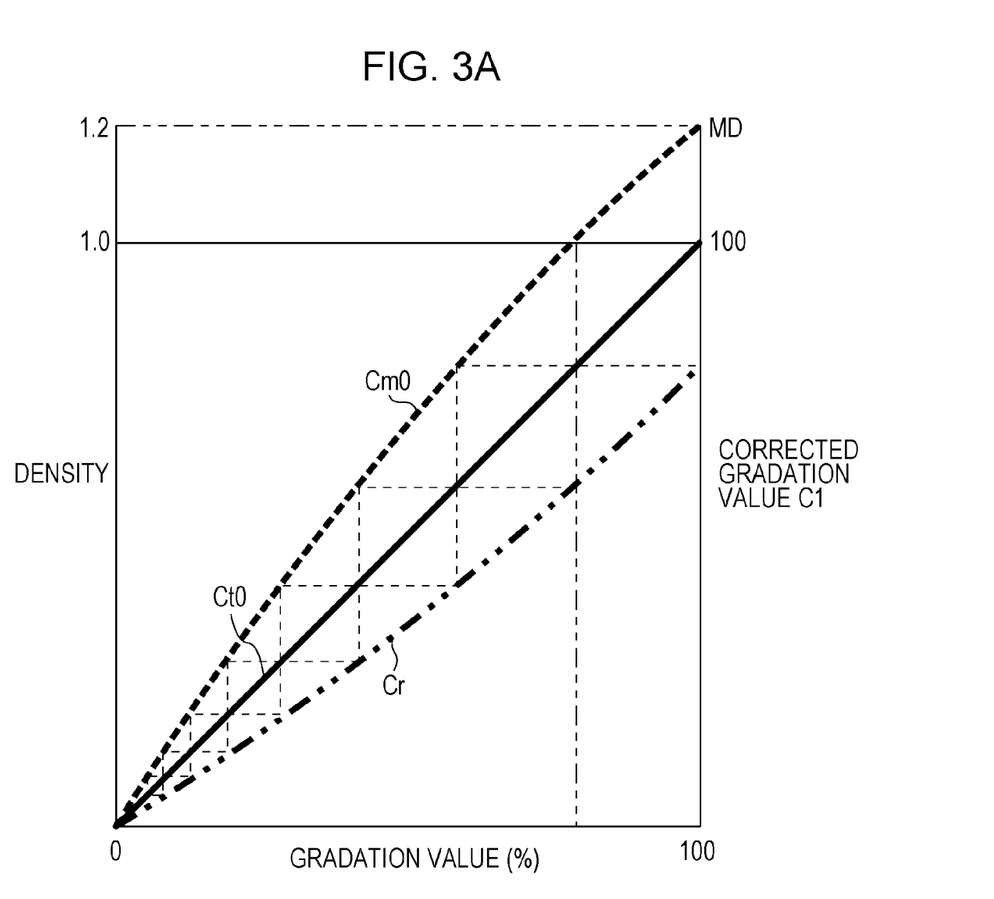
FIGS. 3A and 3B are diagrams for describing a correction characteristic.
Figure 3B:
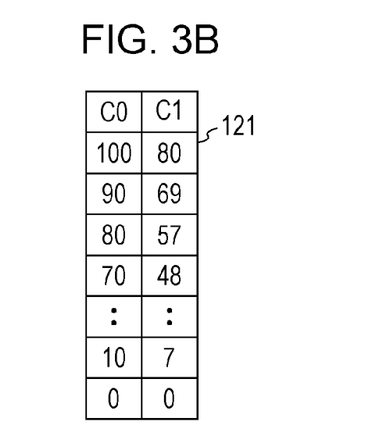

FIGS. 3A and 3B are diagrams for describing the correction characteristic 121. The correction characteristic 121 is set for each of yellow, magenta, cyan, and black so that the output characteristic of the output device 2 becomes closer to a predetermined target characteristic.

In FIG. 3A, the horizontal axis represents the gradation value, and the vertical axis represents the density or the gradation value that has been corrected (corrected gradation value). The gradation value is a numerical value of a signal representing a gray level for each of plural fundamental colors of, for example, the image data 123 that represents an image. In this example, the gradation value is in the range of 0% to 100%. The density shows how dense a toner image formed on a recording medium is in terms of toner weight per unit area. The density may be a relative numerical value with respect to a predetermined density. Therefore, the unit of the density is omitted in the following description.

The target characteristic determined in advance for each color represents the target value of density (target density) of the toner image to be output by the output device 2 for a gradation value set for the color. The target characteristic may be provided as a table showing the correspondence between plural gradation values and target densities, or as a function for calculating the target density by using a gradation value as an independent variable. For example, in FIG. 3A, the target characteristic is shown by a curve Ct0 of a linear function in which the gradation value is an independent variable. According to the target characteristic, the target density is 1.0 when the gradation value is 100%, the target density is 0.5 when the gradation value is 50%, and the target density is 0 when the gradation value is 0%.

Owing to differences in various conditions, such as differences in manufacturing steps and environment, such as temperature and humidity in the operating region, individual output devices 2 may output toner images of different densities even when the same gradation value is supplied thereto. Accordingly, the manufacturer of the image forming system 9 measures, for example, the output characteristic of the output device 2 at the time of shipment, determines the correction characteristic 121 for correcting the gradation value so that the output characteristic becomes closer to the target characteristic, and stores the correction characteristic 121 in the storage unit 12 of the correction device 1.

The color chart data 122 stored in the storage unit 12 is used to cause the output device 2 to form a color chart 40 on a recording medium. The color chart 40 is a color sample including an array of yellow, magenta, cyan, and black image elements at plural gradation values. The controller 11 reads the color chart data 122 from the storage unit 12 and causes the output device 2 to output the color chart 40 at the time of shipment. Since the correction characteristic 121 is in the above-described initial state, the gradation values of the color chart data 122 are supplied to the output device 2 without being corrected by the corrector 114, and the output device 2 outputs the color chart 40 at the supplied gradation values.

The manufacturer of the image forming system 9 measures the output color chart 40 with the colorimeter 30, which is an example of the measurement device 3, and stores the correction characteristic 121 determined from the output characteristic based on the measurement result and the above-described target characteristic in the storage unit 12 of the correction device 1. The curve Cm0 shown in FIG. 3A shows the output characteristic of the output device 2 at the time of shipment.

The curve Cr shown in FIG. 3A represents the correction characteristic 121. The correction characteristic 121 represents the relationship between the gradation value C0 of an image to be output by the output device 2 and the corrected gradation value C1 obtained by correcting the gradation value C0. The correction characteristic 121 is stored in the storage unit 12 in the form of, for example, the table illustrated in FIG. 3B. When the corrected gradation value C1, obtained by correcting the gradation value C0, is supplied to the output device 2, the density of the toner image that is output by the output device 2 in practice becomes closer to the density of the toner image to be output for the gradation value C0, that is, the target density. In other words, as a result of the correction, the curve Cm0 becomes closer to the curve Ct0 in FIG. 3A.

As a result of the correction of the gradation value C0 to the corrected gradation value C1 by the corrector 114, the output characteristic becomes closer to the target characteristic for a single-color toner image. However, the desired toner image may not be obtained when the toner image includes multiple colors. This is because when multiple colors are combined, the colors generally affect each other. To adjust the influence of combining multiple colors, the converter 115 converts the corrected gradation value C1 for each color of the image data 123, which is obtained as a result of the correction by the corrector 114, on the basis of the color conversion profile 124.

Figure 4:
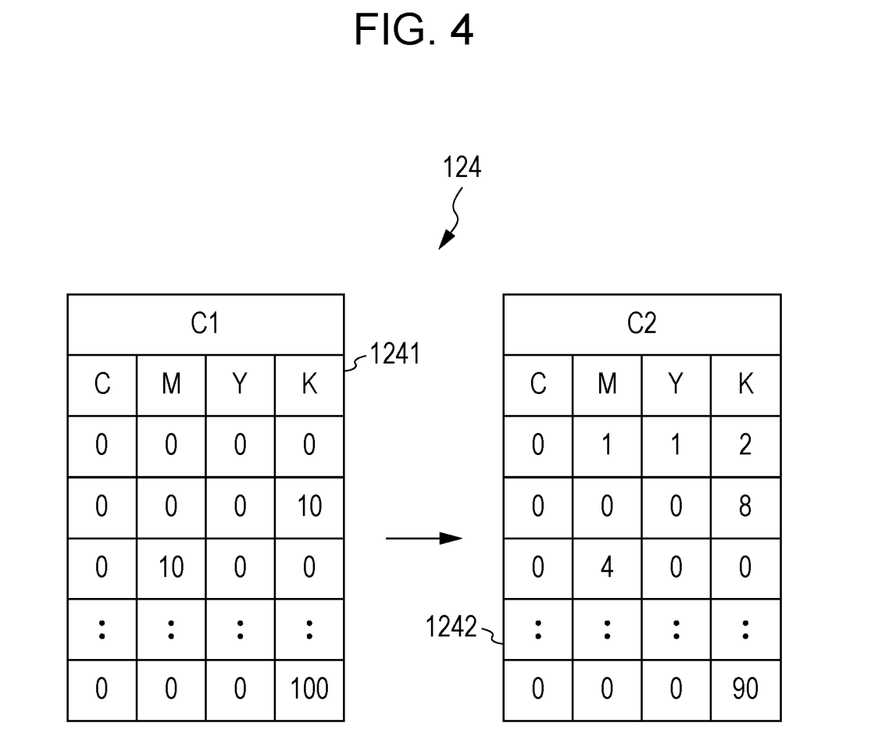
FIG. 4 is a diagram for describing a color conversion profile.

FIG. 4 is a diagram for describing the color conversion profile 124. The color conversion profile 124 is data for converting a color space of the image data 123 or the like into a color space of color materials used by the output device 2 to form a toner image. The color conversion profile 124 includes pre-conversion data 1241 and post-conversion data 1242.

The pre-conversion data 1241 is obtained by quantizing the color space of the image data 123, and includes a data group representing plural representative points in the color space. The post-conversion data 1242 includes a data group representing points obtained by converting the points of the pre-conversion data 1241 into points in the color space of the output device 2. The pre-conversion data 1241 and the post-conversion data 1242 form a single color conversion profile 124.

Among points in the color space of the image data 123 that are represented by the gradation values of the respective colors, points included in the pre-conversion data 1241 of the color conversion profile 124 are converted into the corresponding points of the post-conversion data 1242 by the converter 115. For the points that are not included in the pre-conversion data 1241, the converter 115 performs the conversion by interpolating the points by using the points included in the pre-conversion data 1241.

The gradation values of the image data 123 obtained as a result of the conversion performed by the converter 115 are supplied to the output device 2, and the output device 2 outputs a toner image 41 in accordance with the supplied gradation values.

Next, functions related to a determination process performed by the correction device 1 in response to an instruction from the user of the image forming system 9 after the image forming system 9 has been shipped will be described. The acquisition unit 111, the estimation unit 112, and the determination unit 113 provide the functions for achieving the determination process.

The acquisition unit 111 acquires an output characteristic representing the relationship between a gradation value of the color chart represented by the color chart data 122, the gradation value having been corrected by the corrector 114 in accordance with the correction characteristic 121, and a measured value of a density of a toner image (that is, the color chart 40) output by the output device 2 for the gradation value.

Figure 5:
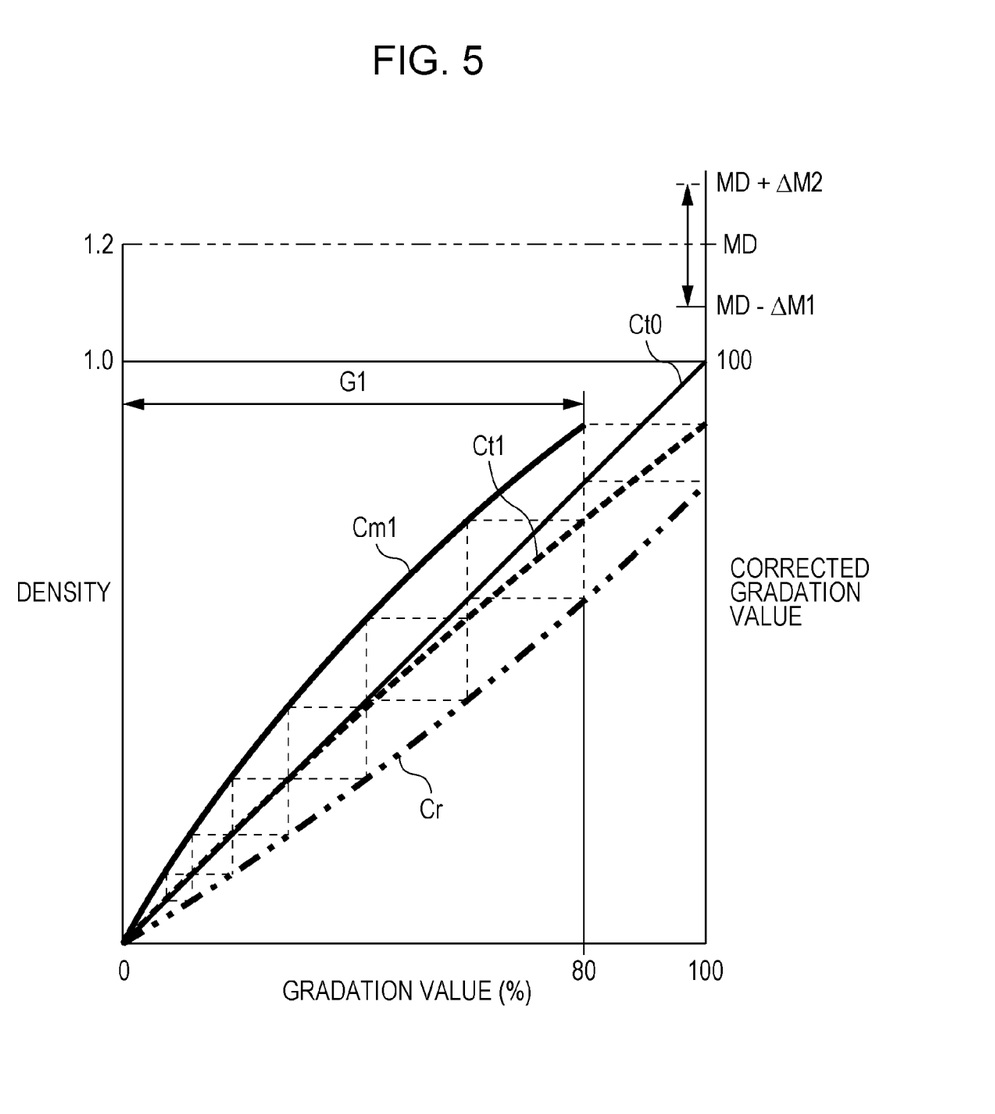
FIG. 5 is a diagram for describing a determination process performed by the correction device in response to an instruction from a user.

FIG. 5 is a diagram for describing a determination process performed by the correction device 1 in response to an instruction from the user. When the image forming system 9 that has been shipped is used for a certain period of time and when, for example, the output characteristic of the output device 2 has changed, the user issues an instruction to perform the determination process. When the controller 11 of the correction device 1 receives the instruction to perform the determination process, the controller 11 reads the color chart data 122 from the storage unit 12, corrects the gradation value of the color chart data 122 in accordance with the correction characteristic 121, and supplies the corrected gradation value to the output device 2. The converter 115 performs the conversion of gradation values of a toner image including multiple colors, and therefore does not perform the conversion when the color chart 40 representing a gradation value of a single-color toner image is output.

The output device 2 outputs the color chart 40 on the basis of the corrected gradation value for the color chart data 122 that has been supplied thereto. The user measures the toner density of the color chart 40 by using the colorimeter 30, and supplies the measured toner density to the correction device 1 through the operation unit 13.

In FIG. 5, the curve Ct1 shows the output characteristic representing the relationship between the supplied toner density and the gradation value of the toner image for which the toner density has been measured. The acquisition unit 111 acquires this output characteristic. As illustrated in FIG. 5, the curve Ct1 is shifted from the curve Ct0 showing the target characteristic. Thus, it is clear that the output characteristic of the output device 2 obtained when the correction characteristic 121 is applied changes over time such that the difference from the target characteristic increases from that at the time of shipment.

The output characteristic acquired by the acquisition unit 111 is based on the measured value of the density of the toner image output in accordance with the corrected gradation value. Therefore, the toner density obtained when a gradation value of 100% is directly supplied to the output device 2 is not included. For example, in the case where the correction characteristic 121 illustrated in FIG. 3B is applied, even when the gradation value C0 before the correction is 100%, the output device 2 receives 80% as the corrected gradation value C1 as a result of the correction of the gradation value C0.

When a predetermined reference gradation value is not within a range of the gradation value corrected by the corrector 114, the estimation unit 112 estimates the density of the toner image output by the output device 2 for the reference gradation value, the estimation being performed on the basis of the output characteristic acquired by the acquisition unit 111. The reference gradation value is a gradation value used as a reference for determining whether or not the correction characteristic 121 needs to be changed. In the image forming system 9, it is determined whether or not the correction characteristic 121 needs to be changed by setting a threshold for the toner density of the toner image output by the output device 2 for the reference gradation value. In the following description, it is assumed that the reference gradation value is 100%. However, the reference gradation value is not limited to 100%, and may instead be, for example, 99%.

More specifically, the controller 11, which functions as the estimation unit 112, determines the range of the corrected gradation value by using the output characteristic acquired by the acquisition unit 111 and the correction characteristic 121. For example, when the output characteristic shown by the curve Ct1 is acquired, the gradation value of the output characteristic is corrected by using the correction characteristic 121 shown by the curve Cr, and the corrected output characteristic that represents the relationship between the corrected gradation value and the density is determined. In FIG. 5, the curve Cm1 shows the corrected output characteristic. The range of the gradation value of the curve Cm1 is the range G1 of the corrected gradation value, and is 0% to 80% in the example illustrated in FIG. 5.

In the correction device 1, the reference gradation value, which serves as a determination reference, is set to 100% in advance, and a suitable density range corresponding to the reference gradation value is defined by thresholds ΔM1 and ΔM2. The thresholds ΔM1 and ΔM2 may be fixed values, or determined in accordance with a maximum measured density MD, which is the maximum value of the measured density in the acquired output characteristic. The suitable density range may be, for example, MD−ΔM1 or more and MD+ΔM2 or less, as illustrated in FIG. 5.

As illustrated in FIG. 5, the range G1 does not include the reference gradation value, which is 100%. Therefore, the density of the toner image output by the current output device 2 when the corrected gradation value is set to 100% is not measured. Accordingly, as described above, the controller 11, which functions as the estimation unit 112, determines the corrected output characteristic shown by the curve Cm1 on the basis of the output characteristic, and estimates, on the basis of the corrected output characteristic, the toner density obtained when the reference gradation value is set as the corrected gradation value.

Figure 6:
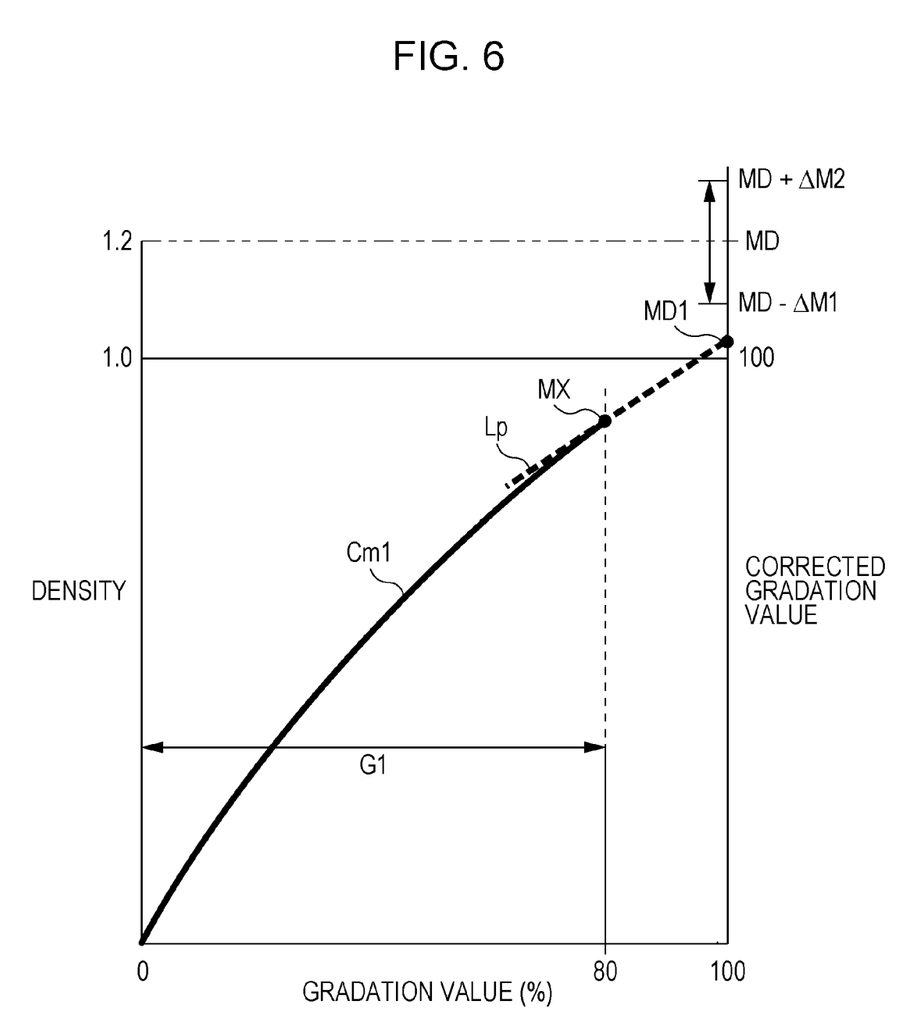
FIG. 6 is a diagram for describing an example of a method for estimating a toner density for a reference gradation value.

FIG. 6 is a diagram for describing an example of a method by which the correction device 1 estimates the toner density for the reference gradation value. As illustrated in FIG. 6, the estimation may be performed by, for example, extrapolating the curve Cm1 that represents the corrected output characteristic. More specifically, a tangent Lp of the curve Cm1 at point MX corresponding to 80%, which is the maximum gradation value of the range G1, is drawn, and point MD1 at which the tangent Lp crosses the straight line representing the reference gradation value, which is 100%, is determined. Thus, the correction device 1 estimates the toner density obtained when the gradation value set in practice is 100%.

The determination unit 113 determines whether or not the correction characteristic 121 needs to be changed by comparing the density estimated by the estimation unit 112 with the predetermined thresholds. In the example illustrated in FIG. 6, the controller 11, which functions as the determination unit 113, determines that the correction characteristic 121 needs to be changed since the point MD1, which shows the estimated toner density, is not within the range of MD−ΔM1 or more and MD+ΔM2 or less. The result of the determination performed by the determination unit 113 is transmitted to the display 14, as illustrated in FIG. 2, and displayed to inform the user of the determination result.

As described above, even when the reference gradation value is not within the range of the gradation value corrected in accordance with the predetermined correction characteristic 121, the correction device 1 estimates the toner density for the reference gradation value from the output characteristic of the output device for the gradation value. Then, whether or not the correction characteristic needs to be changed is determined on the basis of the estimation result.

2. Modification

Although an exemplary embodiment is described above, the exemplary embodiment maybe modified as follows. The following modifications may be applied in combination.

2-1. First Modification

In the above-described exemplary embodiment, the controller 11 of the correction device 1 estimates the toner density for when the reference gradation value is specified as the corrected gradation value by extrapolating the curve Cm1 that represents the corrected output characteristic. However, the estimation may instead be performed by other methods. For example, the correction device 1 may store plural output characteristics under plural conditions in the storage unit 12, each output characteristic representing the relationship between plural gradation values including the reference gradation value and the measured values of densities of toner images output by the output device 2 for the respective gradation values. The controller 11 may estimate the density of the toner image output by the output device 2 for the reference gradation value by comparing the acquired output characteristic and the plural output characteristics stored in the storage unit 12.

Figure 7:
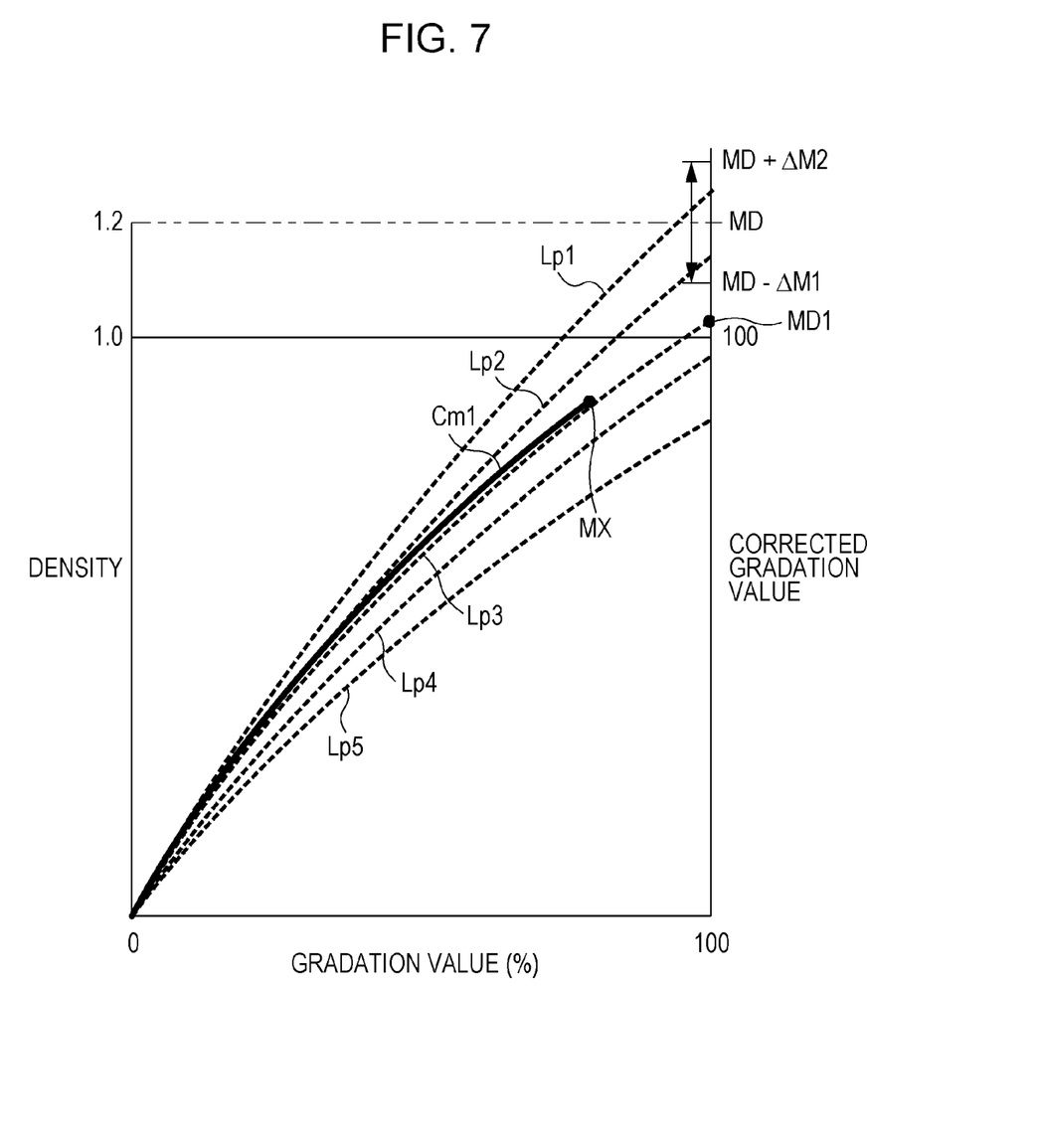
FIG. 7 is a diagram for describing estimation according to a modification.

FIG. 7 is a diagram for describing the estimation according to this modification. The storage unit 12 stores plural output characteristics in advance. The curves Lp1, Lp2, Lp3, Lp4, and Lp5 shown in FIG. 7 are examples of the plural output characteristics.

When the user of the image forming system 9 measures the toner density of the color chart 40 output on the basis of the corrected gradation value by using the colorimeter 30, and when the controller 11, which functions as the acquisition unit 111, acquires the output characteristic representing the relationship between the measured toner density and the gradation value of the toner image for which the toner density has been measured, the controller 11 compares the acquired output characteristic with each of the plural output characteristics stored in the storage unit 12 in advance. Then, the controller 11 estimates, on the basis of the result of the comparison, the density of the toner image output by the output device 2 for the reference gradation value. For example, the controller 11 may select the output characteristic closest to the acquired output characteristic from among the output characteristics stored in the storage unit 12, and determine the toner density corresponding to the reference gradation value according to the selected output characteristic as the estimation result.

The controller 11 may determine the "closest output characteristic" by various methods. For example, the controller 11 may determine the output characteristic closest to the point on the acquired output characteristic at the maximum gradation value as the "closest output characteristic". Alternatively, the output characteristic for which the sum of the differences from the acquired output characteristic is the smallest may be determined as the "closest output characteristic". Alternatively, instead of selecting the output characteristic closest to the acquired output characteristic, the controller 11 may calculate an output characteristic corresponding to the acquired output characteristic by adding the products of the output characteristics stored in the storage unit 12 and weighting coefficients determined in accordance with the differences from the acquired output characteristic.

In the example illustrated in FIG. 7, among the curves Lp1 to Lp5, the curve Lp3 is closest to the curve Cm1. The controller 11 selects the output characteristic shown by the curve Lp3 as the output characteristic corresponding to the acquired output characteristic from among the output characteristics stored in the storage unit 12. Then, the controller 11 may determine the point MD1 corresponding to the reference gradation value, which is 100%, on the curve Lp3 and determine the density at this point MD1 as the estimation result. In this case, since the density at the point MD1 is not within the range of MD−ΔM1 or more and MD+ΔM2 or less, the controller 11 determines that the correction characteristic 121 needs to be changed.

2-2. Second Modification

In the above-described exemplary embodiment, the result of the determination performed by the determination unit 113 is transmitted to the display 14 and displayed to inform the user of the determination result. However, the correction device 1 may change the correction characteristic 121 in accordance with the determination result. In this case, as shown by the dashed lines in FIG. 2, the controller 11 also functions as a changing unit 116. In the case where the determination unit 113 determines that the correction characteristic 121 needs to be changed, the changing unit 116 changes the correction characteristic 121 in accordance with the determination result. For example, the changing unit 116 may calculate a new correction characteristic with which the acquired output characteristic is corrected such that it becomes closer to the target characteristic, and change the correction characteristic 121 by updating the correction characteristic 121 stored in the storage unit 12. In this case, the corrector 114 may correct the gradation value in accordance with the new correction characteristic 121 updated by the changing unit 116.

2-3. Third Modification

In the above-described exemplary embodiment, the controller 11 of the correction device 1 functions as the corrector 114 and the converter 115, and also functions as the acquisition unit 111, the estimation unit 112, and the determination unit 113. However, the functions of the acquisition unit 111, the estimation unit 112, and the determination unit 113 may instead be provided by another device. For example, the image forming system 9 may include a determination device 110 that functions as the acquisition unit 111, the estimation unit 112, and the determination unit 113. The determination device 110 may be formed of a CPU or the like different from the controller 11, and the determination device 110 and the controller 11 may share a bus to pass information to each other. The determination device 110 may be a device that communicates with the correction device 1 through a communication unit (not shown) included in the correction device 1.

2-4. Fourth Modification

In the image forming system 9 illustrated in FIG. 1, the correction device 1 is contained in the output device 2. However, it is not necessary that the correction device 1 be contained in the output device 2. For example, the correction device 1 may be a terminal such as a mobile phone or a slate computer that is wirelessly connected to the output device 2.

2-5. Fifth Modification

The programs to be executed by the controller 11 of the correction device 1 may be provided in such a state that they are stored in a computer-readable recording medium, for example, in a magnetic recording medium such as magnetic tape or a magnetic disc, an optical recording medium such as an optical disc, a magneto-optical recording medium, or a semiconductor memory. Alternatively, the programs may be downloaded from the Internet. Various devices other than a CPU may be used as a control unit, which is the controller 11 in the above-described example. For example, a dedicated processor may be used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A determination device comprising:
 a processor that acts as:
 an acquisition unit that acquires an output characteristic representing a relationship between a gradation value corrected by the processor acting as a correction unit in accordance with a predetermined correction characteristic and a measured value of a density of a toner image output by an output device for the gradation value;
 an estimation unit that estimates a density of a toner image output by the output device for a predetermined reference gradation value based on a determination that the reference gradation value is not within a range of the corrected gradation value, the estimation being performed based on the output characteristic acquired by the processor acting as the acquisition unit, and the estimation unit estimates the density based on a point corresponding to a maximum gradation value of the range and determines a point where a tangent to a gradation value curve crosses a straight line representing the reference gradation value to estimate toner density; and a determination unit that determines whether or not the correction characteristic needs to be changed by comparing the density estimated by the processor acting as the estimation unit with a predetermined threshold.

2. The determination device according to claim 1, wherein the processor acting as the acquisition unit acquires an output characteristic representing a relationship between a plurality of gradation values corrected by the processor acting as the correction unit in accordance with the correction characteristic and measured values of densities of toner images output by the output device for the respective gradation values, and wherein the processor acting as the estimation unit estimates the density of the toner image output by the output device for the reference gradation value when the reference gradation value is not within a range defined by the gradation values included in the output characteristic, the estimation being performed based on the output characteristic.

3. The determination device according to claim 2, wherein the processor acting as the estimation unit estimates the density of the toner image output by the output device for the reference gradation value by extrapolating the output characteristic.

4. A correction device comprising:
a processor that acts as:
a changing unit that changes a correction characteristic when the determination device according to claim 3 determines that the correction characteristic needs to be changed, the correction being performed in accordance with the result of the determination; and
a correction unit that corrects a gradation value in accordance with the correction characteristic changed by the changing unit.

5. An output device that outputs a toner image for a gradation value corrected by the correction device according to claim 4.

6. The determination device according to claim 2, further comprising:
a memory that stores a plurality of output characteristics under a plurality of conditions, each output characteristic representing a relationship between a plurality of gradation values including the reference gradation value and measured values of densities of toner images output by the output device for the respective gradation values,
wherein the processor acting as the estimation unit estimates the density of the toner image output by the output device for the reference gradation value by comparing the output characteristic acquired by the processor acting as the acquisition unit and the plurality of output characteristics stored in the memory.

7. A correction device comprising:
a processor that acts as:
a changing unit that changes a correction characteristic when the determination device according to claim 6 determines that the correction characteristic needs to be changed, the correction being performed in accordance with the result of the determination; and
a correction unit that corrects a gradation value in accordance with the correction characteristic changed by the changing unit.

8. An output device that outputs a toner image for a gradation value corrected by the correction device according to claim 7.

9. A correction device comprising:
a processor that acts as:
a changing unit that changes a correction characteristic when the determination device according to claim 2 determines that the correction characteristic needs to be changed, the correction being performed in accordance with the result of the determination; and
a correction unit that corrects a gradation value in accordance with the correction characteristic changed by the changing unit.

10. An output device that outputs a toner image for a gradation value corrected by the correction device according to claim 9.

11. The determination device according to claim 1, wherein the processor acting as the estimation unit estimates the density of the toner image output by the output device for the reference gradation value by extrapolating the output characteristic.

12. A correction device comprising:
a processor that acts as:
a changing unit that changes a correction characteristic when the determination device according to claim 11 determines that the correction characteristic needs to be changed, the correction being performed in accordance with the result of the determination; and
a correction unit that corrects a gradation value in accordance with the correction characteristic changed by the changing unit.

13. An output device that outputs a toner image for a gradation value corrected by the correction device according to claim 12.

14. The determination device according to claim 1, further comprising:
a memory that stores a plurality of output characteristics under a plurality of conditions, each output characteristic representing a relationship between a plurality of gradation values including the reference gradation value and measured values of densities of toner images output by the output device for the respective gradation values,
wherein the processor acting as the estimation unit estimates the density of the toner image output by the output device for the reference gradation value by comparing the output characteristic acquired by the processor acting as the acquisition unit and the plurality of output characteristics stored in the memory.

15. A correction device comprising:
a processor that acts as:
a changing unit that changes a correction characteristic when the determination device according to claim 14 determines that the correction characteristic needs to be changed, the correction being performed in accordance with the result of the determination; and
a correction unit that corrects a gradation value in accordance with the correction characteristic changed by the changing unit.

16. An output device that outputs a toner image for a gradation value corrected by the correction device according to claim 15.

17. A correction device comprising:
a processor that acts as:
a changing unit that changes a correction characteristic when the determination device according to claim 1 determines that the correction characteristic needs to be changed, the correction being performed in accordance with the result of the determination; and
a correction unit that corrects a gradation value in accordance with the correction characteristic changed by the changing unit.

18. An output device that outputs a toner image for a gradation value corrected by the correction device according to claim 17.

19. A determination method comprising:
acquiring an output characteristic representing a relationship between a gradation value corrected by a processor acting as a correction unit in accordance with a predetermined correction characteristic and a measured value of a density of a toner image output by an output device for the gradation value;
estimating a density of a toner image output by the output device for a predetermined reference gradation value based on a determination that the reference gradation value is not within a range of the corrected gradation value, the estimation being performed based on the acquired output characteristic;
estimating the density based on a point corresponding to a maximum gradation value of the range and determining a point where a tangent to a gradation value curve crosses a straight line representing the reference gradation value to estimate toner density; and
determining whether or not the correction characteristic needs to be changed by comparing the estimated density with a predetermined threshold.

* * * * *